United States Patent
Eriksson

(10) Patent No.: US 6,205,484 B1
(45) Date of Patent: Mar. 20, 2001

(54) CONTROLLING ACCESS TO RESOURCES IN A CONNECTIONLESS NETWORK USING A TICKET MESSAGE CONTAINING RESERVED NETWORK RESOURCE ALLOCATION INFORMATION

(75) Inventor: Anders Eriksson, Bandhagen (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/112,084

(22) Filed: Jul. 8, 1998

(30) Foreign Application Priority Data

Jul. 11, 1997 (GB) ................................. 9714686

(51) Int. Cl.⁷ ........................... G06F 15/16; G06R 15/73
(52) U.S. Cl. ............................................ 709/229; 709/226
(58) Field of Search .................................... 709/229, 226

(56) References Cited

U.S. PATENT DOCUMENTS

| | | |
|---|---|---|
| 4,870,641 | 9/1989 | Pattavina . |
| 4,972,085 | 11/1990 | Weber et al. . |
| 5,048,011 | 9/1991 | Melen . |
| 5,179,556 | 1/1993 | Turner . |
| 5,231,631 | 7/1993 | Buhrke et al. . |
| 5,280,470 | 1/1994 | Buhrke et al. . |
| 5,289,463 | 2/1994 | Mobasser . |
| 5,291,481 | 3/1994 | Doshi et al. . |
| 5,311,513 | 5/1994 | Ahmadi et al. . |
| 5,315,586 | 5/1994 | Charvillat . |
| 5,335,224 | 8/1994 | Cole et al. . |
| 5,363,374 | 11/1994 | Abedeen et al. . |
| 5,381,546 * | 1/1995 | Servi et al. .................. 709/102 |
| 5,432,713 | 7/1995 | Takeo et al. . |
| 5,432,790 | 7/1995 | Hluchyj et al. . |

(List continued on next page.)

FOREIGN PATENT DOCUMENTS

| | | |
|---|---|---|
| 0 388 951 | 9/1990 | (EP) . |
| 0 398037 | 11/1990 | (EP) . |
| 0524467 A2 | 1/1993 | (EP) . |
| 0603099 A1 | 6/1994 | (EP) . |
| 0609 654 A2 | 8/1994 | (EP) . |
| 0624015 | 11/1994 | (EP) . |
| 0 632671 | 1/1995 | (EP) . |
| 0 671860 | 9/1995 | (EP) . |
| 0673 138 A2 | 9/1995 | (EP) . |
| 0 678997 | 10/1995 | (EP) . |
| 0 689318 | 12/1995 | (EP) . |
| 0 693 841 | 1/1996 | (EP) . |

(List continued on next page.)

OTHER PUBLICATIONS

Billing, M.J.; Patents Act 1977: Search Report Under Section 17(5); Sep. 22, 1997; United Kingdom Patent Office; pp. 1–2; In re: Application No. GB 9714686.4.

White, P.: "RSVP and Integrated Services in the Internet: A Tutorial"; IEEE Communications Magazine, May, 1997; pp. 100–106 vol. 35, No. 05.

Karavassilis, N.: PCT International Search Report; Oct. 30, 1998; International Application No. PCT/EP98/04076; pp. 1–3.

Primary Examiner—Krisna Lim
(74) Attorney, Agent, or Firm—Jenkens & Gilchrist, P.C.

(57) ABSTRACT

A method is provided for achieving admission control to a public connectionless packet network. This provides a method of access control which allows service differentiation in a form which permits a user to receive a quality of service guarantee which is better than a "best effort" service. Each transmission by a user across the network includes a message sent to the user from the network. The message includes information about the priority level of the transmission, based on the user's contract with the network provider, and can subsequently be extracted by the network to determine how to handle the transmission, and to determine the resources available for future transmission requests.

13 Claims, 2 Drawing Sheets

U.S. PATENT DOCUMENTS

| | | |
|---|---|---|
| 5,455,826 | 10/1995 | Özveren et al. . |
| 5,467,343 | 11/1995 | Lee et al. . |
| 5,467,348 | 11/1995 | Fujii et al. . |
| 5,477,538 | 12/1995 | Huenlich . |
| 5,485,455 | 1/1996 | Dobbins et al. . |
| 5,491,694 | 2/1996 | Oliver et al. . |
| 5,504,744 | 4/1996 | Adams et al. . |
| 5,506,961 * | 4/1996 | Carlson et al. ............ 713/200 |
| 5,521,910 | 5/1996 | Matthews . |
| 5,533,009 | 7/1996 | Chen . |
| 5,561,663 | 10/1996 | Klausmeier . |
| 5,566,175 | 10/1996 | Davis . |
| 5,579,312 | 11/1996 | Regache . |
| 5,581,703 | 12/1996 | Baugher et al. . |
| 5,583,857 | 12/1996 | Soumiya et al. . |
| 5,634,006 * | 5/1997 | Baugher et al. ............ 709/228 |
| 5,640,389 | 6/1997 | Masaki et al. . |
| 5,745,694 * | 4/1998 | Egawa et al. ............ 709/225 |
| 5,835,710 | 11/1998 | Nagami et al. . |

FOREIGN PATENT DOCUMENTS

| | | |
|---|---|---|
| 0 696 154 | 2/1996 | (EP) . |
| 0 712 220 | 5/1996 | (EP) . |
| 0717532 | 6/1996 | (EP) . |
| 0734195 | 9/1996 | (EP) . |
| 0741475 | 11/1996 | (EP) . |
| 0 746 175 | 12/1996 | (EP) . |
| 2715257 | 7/1995 | (FR) . |
| 2307138 | 5/1997 | (GB) . |
| 2224431 | 9/1990 | (JP) . |
| 4180425 | 6/1992 | (JP) . |
| 6120944 | 4/1994 | (JP) . |
| 6205012 | 7/1994 | (JP) . |
| 8008974 | 1/1996 | (JP) . |
| 8125692 | 5/1996 | (JP) . |
| 8181718 | 7/1996 | (JP) . |
| 8184694 | 7/1996 | (JP) . |
| WO 96/08931 | 3/1996 | (WO) . |
| WO 96/27964 | 9/1996 | (WO) . |
| WO 96/27965 | 9/1996 | (WO) . |
| WO 96/27966 | 9/1996 | (WO) . |
| WO 96/29805 | 9/1996 | (WO) . |
| WO 97/01895 | 1/1997 | (WO) . |
| WO 97/03189 | 1/1997 | (WO) . |

* cited by examiner

CONTROLLING ACCESS TO RESOURCES IN A CONNECTIONLESS NETWORK USING A TICKET MESSAGE CONTAINING RESERVED NETWORK RESOURCE ALLOCATION INFORMATION

TECHNICAL FIELD OF THE INVENTION

This invention relates to the field of resource reservation, and in particular to a method of controlling access to a communications network, and to a network using such a method.

DESCRIPTION OF RELATED ART

The Internet is a communications network which is becoming widely available. The Internet provides a "best effort" bearer service. That is, the user receives the best service available at the time he requests it, but no commitments are given to the user in terms of available bandwidth, transit delay, or packet loss. The Internet is particularly useful in data communications applications, but is of limited use for telecommunications applications which require guaranteed bandwidth availability, and specify maximum values for the transit delay and loss of data. The Internet cannot usually guarantee the required quality of service.

One conventional way of achieving resource reservation, to be able to provide a required quality of service commitment, is to use connection states to store information in the network nodes about bandwidth, buffer parameters, connection identity and status. However, an advantage of the Internet is that it is a connectionless network, which therefore cannot use this technique without sacrificing the simplicity of the Internet.

One conventional way of achieving bearer service differentiation, in a connectionless network, is to use a set of priority bits in the packet header. However, in a public connectionless network, it is still necessary to control how many connections use the highest available priority. If every connection uses the highest available priority, the network can still in effect only offer a best effort service to the users.

A problem remains, therefore, as to how to control admission to the network.

SUMMARY OF THE INVENTION

The present invention seeks to solve the problem of achieving admission control and resource reservation in a connectionless network.

A further object of the invention is to provide a method of access control which, in preferred embodiments, allows service differentiation in a form which permits a user to receive a quality of service guarantee which is better than a "best effort" service.

According to the invention, each transmission by a user across the network includes a message sent to the user from the network. The message includes information about the priority level of the transmission, based on the user's contract with the network provider, and can subsequently be extracted by the network to determine how to handle the transmission.

Thus, rather than rely on the network being able to detect the status of the connection, the relevant information is transmitted by the user with the data transmission, and can be extracted by the network as required.

For a better understanding of the present invention, and to show how it may be brought into effect, reference will now be made, by way of example, to the accompanying drawings.

DETAILED DESCRIPTION OF PREFERRED EMBODIMENTS

Figure 1:
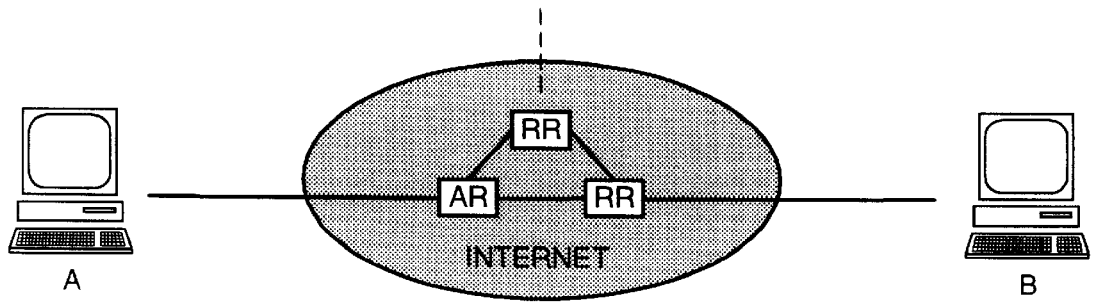
FIG. 1 is a schematic representation of a network in accordance with the invention.

FIG. 1 represents a network in accordance with the invention. In FIG. 1, a user at terminal A intends to send a message, in the form of data packets, to terminal B across the Internet. The Internet includes a large number of nodes, of which only a small number are shown in FIG. 1. These are designated real-time routers RR, while the node to which the terminal A is connected is designated the access router AR.

Although the invention is described herein with reference to the Internet, it is applicable to any connectionless packet network, whether public or private.

In accordance with preferred embodiments of the invention, the sender has a traffic contract with its network provider, under which a particular quality of service is guaranteed. This allows the network provider to offer service differentiation to users. Thus, users who are prepared to pay higher charges are able to guarantee access to higher bandwidths, or higher priority traffic handling.

Figure 2:
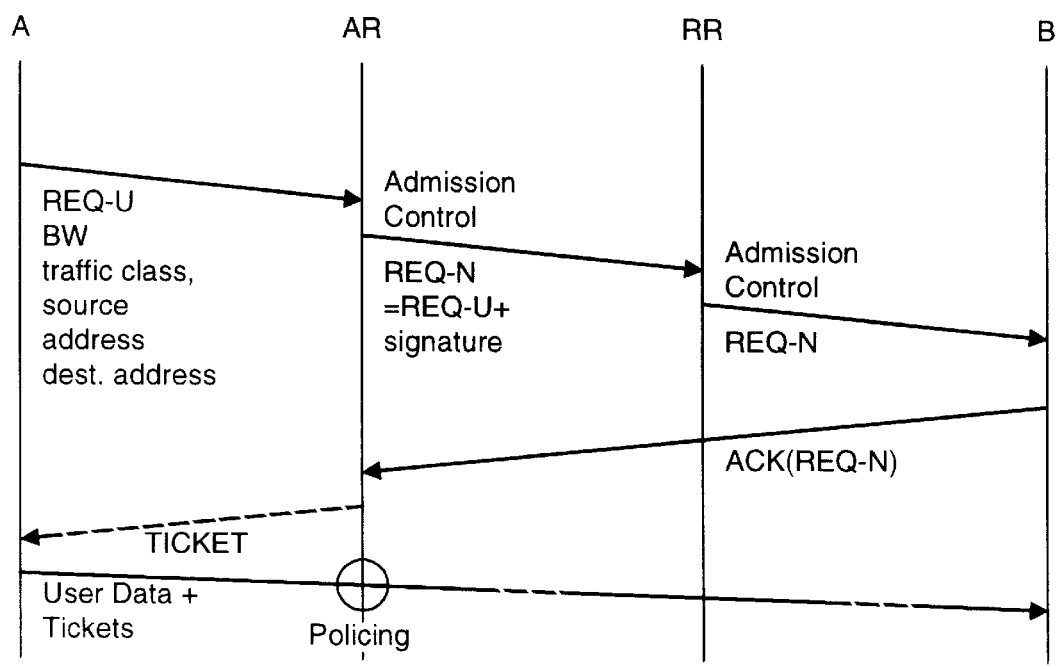
FIG. 2 illustrates the flow of signalling messages in accordance with the invention.

The flow of signalling messages during a data transmission will now be described with reference to FIG. 2, while the steps taken in the access router AR will be described with reference to the flow chart of FIG. 3.

When the sender wishes to initiate a data transmission, a user resource reservation request REQ-U is sent from the terminal A, and received at the access router AR in step 1 of the method. The resource reservation request specifies the required bandwidth for the transmission, the required traffic class, the source address and the destination address. These parameters are thus set for the duration of the transmission at this stage.

In step 2 of the method, it is determined at the access router AR whether the resource reservation request passes the admission control. This admission control is performed in a generally conventional way, in that the required bandwidth specified in the resource reservation request is checked against the bandwidth available to that user, and in the system generally. If the resource reservation request does not pass the admission control, the request is denied.

As described in more detail below, the information needed for admission control is not stored in the network on a per connection basis, but can be extracted by the network as required from messages associated with every transmission which gains access to the network. Thus, these messages must contain all information which is necessary to allow the network nodes to perform admission control and policing of the transmission as required.

If the resource reservation request passes the admission control, the method passes to step 3. Here, the access router AR sends a network resource reservation request REQ-N across the Internet to the terminal B. Each node in the transmission path can perform resource reservation and admission control. If the required bandwidth is available across the network, an acknowledgement is sent from the terminal B to the access router AR, and received in step 4 of the method.

As described above, it is assumed that the network is able to support resource reservation from end to end. However, it will be appreciated that the invention is equally applicable when resource reservation is only available over a specific network domain, covering only a part of the end to end path. In such a case, the reservation protocol is terminated by the routers at the edges of that network domain.

Following receipt by the access router AR of the acknowledgement message, required information about the state of the connection is passed, in accordance with the invention, from the network to the user A in step 5 of the method. Specifically, information about the resources allocated to the connection, and other connection parameters (for example those specified in the traffic contract) is sent from the access router AR to the sender A in a ticket message. The information in the ticket message is preferably protected by a digital signature, to prevent its alteration by the user A.

Then, during transmission of the data across the network the ticket message is inserted into the data packet flow by the sender. The ticket message may be sent with every packet of the data flow, or may be inserted periodically. As a further alternative, if the network polices data flows on a sample basis, the ticket message may be included only when requested by the network. Any ticket message is received at the access router in step 6 of the method illustrated in FIG. 3. The access router, and other nodes in the transmission path, can then use the ticket message for policing the packet flows, in step 7 of the method. Thus, if a packet flow seeks to use a particular priority level or bandwidth, without including a ticket message which authorises such use, the flow can be policed.

The ticket message is then transmitted across the network with the data packet flow. Thus, the ticket message has a function which is similar in some ways to the priority bits which can be added to a packet header before transmission across a connectionless network. However, the ticket message used in accordance with the invention is determined by the network itself, so that it becomes possible to ensure that users receive a service which is in accordance with their quality of service guarantees, and ensures that users cannot reserve high priority resources which go beyond those guaranteed.

In one embodiment, the user must still set priority bits in a conventional way, but the ticket message, determined by the network and transmitted by the user with the data flow, states which priority levels may validly be set by the user for a particular data flow.

Figure 3:
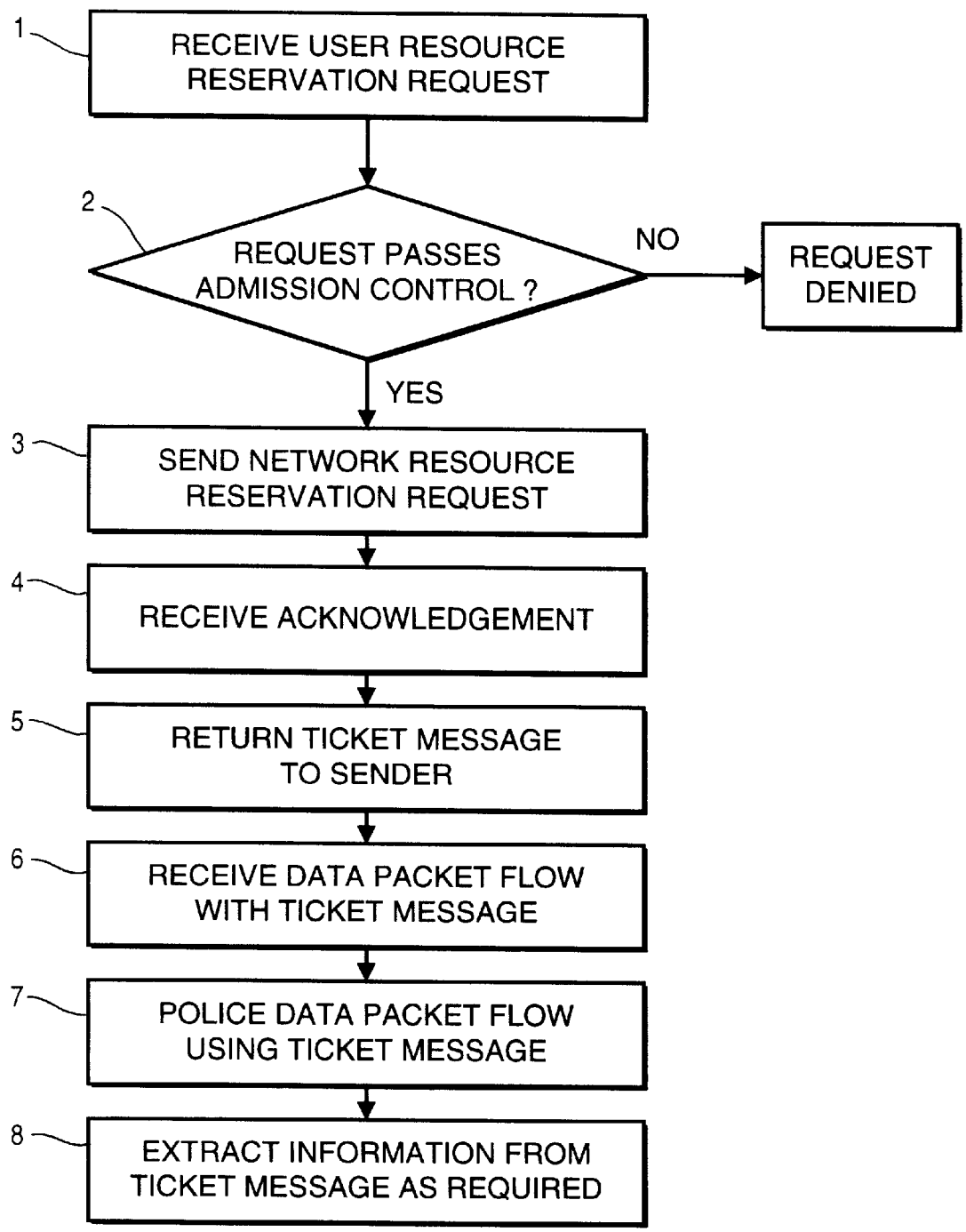
FIG. 3 is a flow chart indicating the steps taken in a method in accordance with the invention.

As indicated in step 8 of the method illustrated in FIG. 3, the network can use the ticket message at any time to extract information about the connection. For example, the ticket message may contain information about the allocated bandwidth, the priority level, the quality of service parameters, and the time of expiry thereof, amongst other things. Thus, this information does not need to be stored within the network on a per connection basis, but rather the network can remain connectionless. However, the network can obtain the information which it requires about all connections, in order to be able to calculate the total amount of resources which have been allocated in every priority level on every link in the network. This allows the network admission control function to determine whether a new resource reservation request can be accepted, or must be rejected.

As an alternative to using the ticket messages in this way, the estimation of the resources already reserved can be achieved using a conventional method such as measuring the aggregate data flow. The ticket message may then only be used to request new reservations and to support policing.

Further possible uses of the ticket messages transmitted in accordance with the invention are to support charging, for example by logging the tickets for a data flow, or for network management purposes, for example using the periodic transmission and acknowledgement of the ticket message as an indication that a data channel is operational.

A further advantage of the invention is that an operator can choose to run his network in a connectionless manner, as described herein, or in a connection oriented mode, using the information in the request and ticket messages to set up a connection state for the data flow. A single message, passing through several operator domains, can pass through networks operating in both modes. It may be advantageous to use a connection oriented mode in an access router to support charging, while the rest of the network operates in a connectionless manner.

There is thus described a system which allows bearer service differentiation in a connectionless network.

What is claimed is:

1. A method for reserving network resources for a transmission from a first network user, the method comprising:

receiving a resource reservation request from the first network user to initiate a reservation;

confirming that the required resource is available;

sending from the network to the first network user a ticket message containing reserved network resource allocation information, the reserved network resource allocation information being associated with network resources allocated for use by the first network user, allowing access to the network for a transmission from the first network user, only if the transmission includes the ticket message containing the reserved network resource allocation information.

2. A method as claimed in claim 1, wherein the ticket message containing reserved network resource allocation information cannot be altered by the first network user.

3. A method as claimed in claim 2, wherein the ticket message containing reserved network resource allocation information is protected by a digital signature.

4. A method as claimed in claim 1, where in the ticket message containing reserved network resource allocation information is used to police access to the network.

5. A method as claimed in claim 1, wherein the ticket message containing reserved network resource allocation information includes information about a bandwidth allocated to the transmission.

6. A method as claimed in claim 1, wherein the ticket message containing reserved network resource allocation information includes information about a priority level allocated to the transmission.

7. A method as claimed in claim 1, wherein the ticket message containing reserved network resource allocation information includes information about a quality of service guarantee to the first network user.

8. A method as claimed in claim 1, wherein the ticket message containing reserved network resource allocation information includes information about a time of expiry thereof.

9. A method as claimed in claim 1, wherein the ticket message containing reserved network resource allocation information includes information about a source address of the transmission.

10. A method as claimed in claim 1, wherein the ticket message containing reserved network resource allocation information includes information about a destination address of the transmission.

11. A node for a communications network, comprising:

means for receiving an access request from a user;

means for determining whether resources are available for a received access request;

means for transmitting to the user a ticket message containing reserved network resource allocation information, if resources are available; and means for restricting access to the network to allow access for transmissions only if the transmissions include an appropriate ticket message containing the reserved network resource allocation information.

12. A node for a communications network, as claimed in claim 11, comprising:

means for extracting data from ticket messages containing reserved network resource allocation information associated with respective transmissions; and means for using said data for determining whether resources are available for the received access request.

13. A method of achieving admission control in a network, the method comprising:

receiving a resource reservation request from a user to initiate a reservation;

sending to the user a ticket message containing reserved network resource allocation information;

requiring a subsequent transmission from the user to return the ticket message; and applying admission control on the basis of the content of the ticket message.

* * * * *